United States Patent
Sunahara et al.

(10) Patent No.: US 10,253,711 B2
(45) Date of Patent: Apr. 9, 2019

(54) VEHICLE BEHAVIOR CONTROL DEVICE

(71) Applicant: MAZDA MOTOR CORPORATION, Hiroshima (JP)

(72) Inventors: Osamu Sunahara, Hiroshima (JP); Daisuke Umetsu, Hiroshima (JP); Chikako Ohisa, Hiroshima (JP); Yasunori Takahara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 99 days.

(21) Appl. No.: 15/382,953

(22) Filed: Dec. 19, 2016

(65) Prior Publication Data

US 2017/0175659 A1 Jun. 22, 2017

(30) Foreign Application Priority Data

Dec. 22, 2015 (JP) .................. 2015-250085

(51) Int. Cl.
*B62D 15/02* (2006.01)
*F02B 75/18* (2006.01)
(Continued)

(52) U.S. Cl.
CPC ........... *F02D 41/107* (2013.01); *B62D 15/02* (2013.01); *F02B 75/18* (2013.01); *F02D 11/105* (2013.01); *F02D 17/02* (2013.01); *F02D 29/02* (2013.01); *F02D 41/0087* (2013.01); *F02D 41/12* (2013.01); *F02D 41/26* (2013.01); *B60W 2510/205* (2013.01); *B60W 2710/205* (2013.01); *F02B 2075/1816* (2013.01);
(Continued)

(58) Field of Classification Search
CPC ....... B62D 15/02; F02B 75/18; F02D 11/105; F02D 17/02; F02D 29/02; F02D 41/0087; F02D 41/12; F02D 41/26
USPC .......................................................... 701/70
See application file for complete search history.

(56) References Cited

U.S. PATENT DOCUMENTS 8,433,493 B2  4/2013 Takahashi et al.
8,538,653 B2  9/2013 Miyajima et al.
(Continued)

FOREIGN PATENT DOCUMENTS

EP  2712780 A1  4/2014
EP  2712782 A1  4/2014
(Continued)

*Primary Examiner* — Maceeh Anwari
(74) *Attorney, Agent, or Firm* — Studebaker & Brackett PC

(57) ABSTRACT

The vehicle behavior control device comprises an engine control part operable, when an steering speed is greater than a predetermined threshold, and both of a steering wheel angle of a vehicle and the steering speed are increasing, to reduce an output torque of a multi-cylinder internal combustion engine along with an increase in the steering speed, and when the steering speed is equal to or less than the threshold, to stop the reduction of the output torque, and a threshold setting part operable, when the operation mode of the engine is the all-cylinder operation, to set the threshold to a first threshold $T_{S1}$, and, when the operation mode of the engine is the reduced-cylinder operation, to set the threshold to a second threshold $T_{S2}$ which is less than the first threshold $T_{S1}$.

6 Claims, 8 Drawing Sheets

(51) Int. Cl.
    *F02D 11/10*    (2006.01)
    *F02D 17/02*    (2006.01)
    *F02D 29/02*    (2006.01)
    *F02D 41/00*    (2006.01)
    *F02D 41/10*    (2006.01)
    *F02D 41/12*    (2006.01)
    *F02D 41/26*    (2006.01)

(52) U.S. Cl.
    CPC .... *F02D 2200/501* (2013.01); *F02D 2200/60* (2013.01); *F02D 2200/602* (2013.01); *F02D 2250/18* (2013.01); *F02D 2250/26* (2013.01)

(56) References Cited

U.S. PATENT DOCUMENTS

| | | |
|---|---|---|
| 8,676,464 B2 | 3/2014 | Shimura et al. |
| 8,880,293 B2 | 11/2014 | Hirao et al. |
| 8,977,464 B1 | 3/2015 | Takahashi et al. |
| 8,989,981 B2 | 3/2015 | Yamakado et al. |
| 9,043,116 B2 | 5/2015 | Takahashi et al. |
| 9,086,427 B2 | 7/2015 | Maeda et al. |
| 9,139,107 B2 | 9/2015 | Kageyama et al. |
| 9,211,875 B2 | 12/2015 | Harada |
| 9,296,374 B2 | 3/2016 | Yamakado et al. |
| 9,352,747 B2 | 5/2016 | Nagatsuka et al. |
| 2011/0202250 A1 | 8/2011 | Miyajima et al. |
| 2012/0053791 A1 | 3/2012 | Harada |
| 2012/0209489 A1 | 8/2012 | Saito et al. |
| 2012/0277965 A1 | 11/2012 | Takahashi et al. |
| 2012/0316744 A1 | 12/2012 | Shimura et al. |
| 2013/0041541 A1 | 2/2013 | Kageyama et al. |
| 2013/0079988 A1 | 3/2013 | Hirao et al. |
| 2013/0345901 A1 | 12/2013 | Maeda et al. |
| 2014/0222309 A1 | 8/2014 | Yamakado et al. |
| 2015/0094924 A1 | 4/2015 | Takahashi et al. |
| 2015/0094927 A1 | 4/2015 | Takahashi et al. |
| 2015/0120121 A1 | 4/2015 | Nobumoto et al. |
| 2015/0166025 A1 | 6/2015 | Nagatsuka et al. |
| 2015/0239442 A1 | 8/2015 | Yamakado et al. |
| 2015/0298696 A1 | 10/2015 | Nagatsuka et al. |
| 2015/0321669 A1 | 11/2015 | Inou et al. |
| 2015/0367852 A1 | 12/2015 | Nagatsuka et al. |
| 2016/0059852 A1 | 3/2016 | Yamakado et al. |
| 2016/0244038 A1 | 8/2016 | Yamakado et al. |

FOREIGN PATENT DOCUMENTS

| | | |
|---|---|---|
| JP | 2011-088576 A | 5/2011 |
| JP | 2014-166014 A | 9/2014 |
| JP | 2015-085820 A | 5/2015 |
| JP | 2015-085823 A | 5/2015 |
| JP | 2015-089251 A | 5/2015 |
| JP | 2015-089252 A | 5/2015 |
| JP | 2015-182752 A | 10/2015 |
| JP | 2016-039750 A | 3/2016 |
| JP | 2016-039751 A | 3/2016 |
| WO | 2012/042935 A1 | 4/2012 |
| WO | 2014/054432 A1 | 4/2014 |
| WO | 2014/119171 A1 | 8/2014 |
| WO | 2016/020718 A1 | 2/2016 |

VEHICLE BEHAVIOR CONTROL DEVICE

TECHNICAL FIELD

The present invention relates to a vehicle behavior control device, and more particularly to a vehicle behavior control device for controlling a behavior of a vehicle equipped with a multi-cylinder internal combustion engine capable of switching operation modes between an all-cylinder operation in which combustion of an air-fuel mixture is performed in all of a plurality of cylinders and a reduced-cylinder operation in which combustion in a part of the plurality of cylinders is stopped.

BACKGROUND ART

Heretofore, there has been known a control system capable of, in a situation where a behavior of a vehicle becomes unstable due to road wheel slip or the like, controlling the vehicle behavior to enable a safe traveling (e.g., an antiskid brake system). Specifically, there has been known a control system operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to adjust a degree of deceleration during vehicle cornering to thereby adjust a load to be applied to front road wheels so as to allow a series of driver's operations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable (see, for example, the following Patent Document 1).

Further, there has been proposed a vehicle behavior control device operable to reduce a driving force for a vehicle according to a yaw rate-related quantity corresponding to a steering wheel operation of a driver (e.g., yaw acceleration), thereby making it possible to quickly generate a vehicle deceleration in response to start of the steering wheel operation by the driver and thus quickly apply a sufficient load to front road wheels as steerable road wheels (see, for example, the following Patent Document 2). In this vehicle behavior control device, in response to start of the steering wheel operation, a load is quickly applied to the front road wheels to cause an increase in frictional force between each of the front road wheels and a road surface and thus an increase in cornering force of the front road wheels, thereby providing an improved turn-in ability of the vehicle in an initial phase after entering a curve, and an improved responsiveness to a turning operation of a steering wheel. This makes it possible to realize a vehicle behavior as intended by the driver.

CITATION LIST

Patent Document

Patent Document 1: JP 2011-88576A
Patent Document 2: JP 2014-166014A

SUMMARY OF INVENTION

Technical Problem

When the vehicle behavior control device described in the Patent Document 2 operates to reduce an output torque of a multi-cylinder internal combustion engine so as to reduce a driving force for a vehicle according a steering wheel operation of a driver, torque reduction control (e.g., retarding an ignition timing or reducing a fuel injection amount) is performed in order from a cylinder which has a combustion timing coming immediately after a torque reduction request is issued in response to the driver's steering wheel operation.

Meanwhile, with regard to a multi-cylinder internal combustion engine having a plurality of cylinders, there has been known a technique of switching operation modes between an all-cylinder operation in which combustion of an air-fuel mixture is performed in all of the cylinders and a reduced-cylinder operation in which combustion in a part of the cylinders is stopped (a part of the cylinders is deactivated), depending on a driving state of a vehicle.

During the reduced-cylinder operation in such a cylinder deactivatable engine (variable cylinder engine), combustion is prohibited in two or more cylinders which are mutually non-consecutive in terms of a combustion sequence (firing order), and combustion is sequentially performed in the remaining cylinders. That is, a combustion interval during the reduced-cylinder operation becomes longer as compared to that during the all-cylinder operation.

Thus, when the vehicle behavior control device described in the Patent Document 2 operates to reduce an output torque of the cylinder deactivatable engine so as to reduce a driving force for a vehicle according a steering wheel operation of a driver, a difference can occur between the all-cylinder operation and the reduced-cylinder operation, in terms of a time period after issuance of the torque reduction request through until a combustion timing first comes in one of the cylinders and the torque reduction control is started. Therefore, when the operation mode switching between the all-cylinder operation and the reduced-cylinder operation is performed, there is a possibility that a difference occurs in terms of a timing at which a cornering force of front road wheels is increased based on the output torque reduction, and a timing at which a reaction force to a steering wheel is increased according to the increase in the cornering force, thereby leading to a situation where a vehicle behavior becomes different between the two modes, and a driver is given an uncomfortable feeling.

The present invention has been made in view of solving the above conventional problem, and an object thereof is to provide a vehicle behavior control device capable of, even when switching between an all-cylinder operation and a reduced-cylinder operation in a cylinder deactivatable engine, performing a vehicle behavior control so as to accurately realize a vehicle behavior as intended by a driver, without giving any uncomfortable feeling to the driver.

Solution to Technical Problem

In order to achieve the above object, the present invention provided a vehicle behavior control device for controlling a behavior of a vehicle equipped with a multi-cylinder internal combustion engine capable of switching operation modes between an all-cylinder operation in which combustion of an air-fuel mixture is performed in all of a plurality of cylinders and a reduced-cylinder operation in which combustion in a part of the plurality of cylinders is stopped. The vehicle behavior control device comprises: engine control part operable, when a yaw rate-related quantity which is related to a yaw rate of the vehicle is greater than a predetermined threshold, and both of a steering wheel angle of the vehicle and the yaw rate-related quantity are increasing, to reduce an output torque of the engine along with an increase in the yaw rate-related quantity, and when the yaw rate-related quantity is equal to or less than the threshold, to stop the reduction of the output torque; and threshold setting part operable, when the operation mode of the engine is the all-cylinder operation, to set the threshold to a first threshold, and, when the operation mode of the engine is the reduced-cylinder operation, to set the threshold to a second threshold which is less than the first threshold.

In the vehicle behavior control device of the present invention having the above feature, the engine control part is operable, when the yaw rate-related quantity is greater than the predetermined threshold, and both of the steering wheel angle of the vehicle and the yaw rate-related quantity are increasing, to reduce an output torque of the engine along with an increase in the yaw rate-related quantity, and, when the yaw rate-related quantity is equal to or less than the threshold, to stop the output torque reduction. Thus, when the yaw rate-related quantity is greater than the threshold, it becomes possible to add a deceleration to the vehicle based on a torque reduction amount according to the yaw rate-related quantity to thereby quickly apply a load to the vehicle to control a vehicle behavior with a good responsiveness to a driver's intentional steeling wheel operation. On the other hand, when the yaw rate-related quantity is equal to or less than the threshold, it becomes possible to suppress excessive responsiveness of the vehicle to a steering wheel operation at a small steering wheel angle to thereby perform a vehicle behavior control so as to accurately realize a vehicle behavior as intended by the driver.

Further, the threshold setting part is operable, when the operation mode of the engine is the all-cylinder operation, to set a first threshold as the threshold concerning the yaw rate-related quantity and serving as a boundary value for determining whether the output torque reduction according to the yaw rate-related quantity should be performed or stopped, and, when the operation mode of the engine is the reduced-cylinder operation, to set a second threshold which is less than the first threshold, so that a timing at which the torque reduction amount rises up after start of the steering wheel operation is earlier during the reduced-cylinder operation than during the all-cylinder operation. Thus, when engine control is performed during the reduced-cylinder operation to reduce the output torque according to the yaw rate-related quantity, it becomes possible to start the engine control from a cylinder which precedes a cylinder during the all-cylinder operation in terms of a combustion sequence, to thereby prevent delay in a timing at which a cornering force of front road wheels is increased based on the output torque reduction, and a timing at which a reaction force to a steering wheel is increased according to the increase in the cornering force. In addition, the second threshold used during the reduced-cylinder operation is set to be less than the first threshold used during the all-cylinder operation, so that it becomes possible to perform the output torque reduction according to the yaw rate-related quantity, during the reduced-cylinder operation, with a higher frequency than that during the all-cylinder operation to thereby compensate for an influence of the fact that the number of cylinders capable of being subjected to the control of reducing the output torque according to the yaw rate-related quantity during the reduced-cylinder operation is less than that during the all-cylinder operation, with an increase in frequency of performing the output torque reduction according to the yaw rate-related quantity, and thus suppress giving an uncomfortable feeling to a driver.

This makes it possible to perform a vehicle behavior control so as to accurately realize a vehicle behavior as intended by a driver, without giving any uncomfortable feeling to the driver, even when switching between the all-cylinder operation and the reduced-cylinder operation is performed.

Preferably, in the vehicle behavior control device of the present invention, the yaw rate-related quantity is a steering speed of the vehicle, wherein the first threshold is set in the range of 3 deg/s to 5 deg/s.

In the vehicle behavior control device having this feature, the first threshold is set in the range of 3 deg/s to 5 deg/s, so that it becomes possible to prevent a driver from feeling that straight-ahead driving performance becomes poor due to a vehicle behavior excessively sensitive to a steering wheel operation during straight-ahead driving of the vehicle, or from feeling unreliable due to poor responsiveness of the vehicle to a steering wheel operation during straight-ahead driving of the vehicle, and further prevent a driver from feeling excessive heaviness or discontinuity in operation of steering wheel operation. This makes it possible to perform a vehicle behavior control so as to accurately realize a vehicle behavior as intended by a driver, while reliably preventing an uncomfortable feeling concerning a vehicle behavior during straight-ahead driving of the vehicle from being given to the driver.

More preferably, in the above vehicle behavior control device, the first threshold is set to 4 deg/s.

In the vehicle behavior control device having this feature, the first threshold is set to 4 deg/s, so that it becomes possible to prevent a driver from feeling that straight-ahead driving performance becomes poor due to a vehicle behavior excessively sensitive to a steering wheel operation during straight-ahead driving of the vehicle, or from feeling unreliable due to poor responsiveness of the vehicle to a steering wheel operation during straight-ahead driving of the vehicle, and further prevent a driver from feeling excessive heaviness or discontinuity in operation of the steering wheel. This makes it possible to perform a vehicle behavior control so as to accurately realize a vehicle behavior as intended by a driver, while further reliably preventing an uncomfortable feeling concerning a vehicle behavior during straight-ahead driving of the vehicle from being given to the driver.

Preferably, the above vehicle behavior control device, the second threshold is less than the first threshold by 1 deg/s.

In the vehicle behavior control device having this feature, when engine control is performed during the reduced-cylinder operation to reduce the output torque according to the steering speed, it becomes possible to start the engine control at an earlier timing than that during the all-cylinder operation, to thereby prevent delay in the timing at which a cornering force of front road wheels is increased based on the output torque reduction, and the timing at which a reaction force to a steering wheel is increased according to the increase in the cornering force.

Preferably, in the vehicle behavior control device of the present invention, the threshold setting part is operable, when the operation mode of the engine is the reduced-cylinder operation, to reduce the second threshold to a smaller value as the number of cylinders to be deactivated to stop combustion of an air-fuel mixture therein becomes larger.

In the vehicle behavior control device having this feature, it becomes possible to, as the number of deactivated cylinders during the reduced-cylinder operation becomes larger and thereby a combustion interval becomes longer, advance a timing at which the torque reduction amount rises up after start of the steering wheel operation, and perform the output torque reduction according to the steering speed with a higher frequency. This makes it possible to, even when the number of deactivated cylinders is increased during the reduced-cylinder operation, reliably prevent delay in the timing at which a cornering force of front road wheels is increased based on the output torque reduction, and the timing at which a reaction force to a steering wheel is increased according to the increase in the cornering force, and reliably suppress uncomfortable feeling given to a driver.

Effect of Invention

The vehicle behavior control device of the present invention is capable of, even when switching between the all-cylinder operation and the reduced-cylinder operation in the cylinder deactivatable engine, performing a vehicle behavior control so as to accurately realize a vehicle behavior as intended by a driver, without giving any uncomfortable feeling to the driver.

DESCRIPTION OF EMBODIMENTS

With reference to the accompanying drawings, a vehicle behavior control device according to one embodiment of the present invention will now be described.

Figure 1:
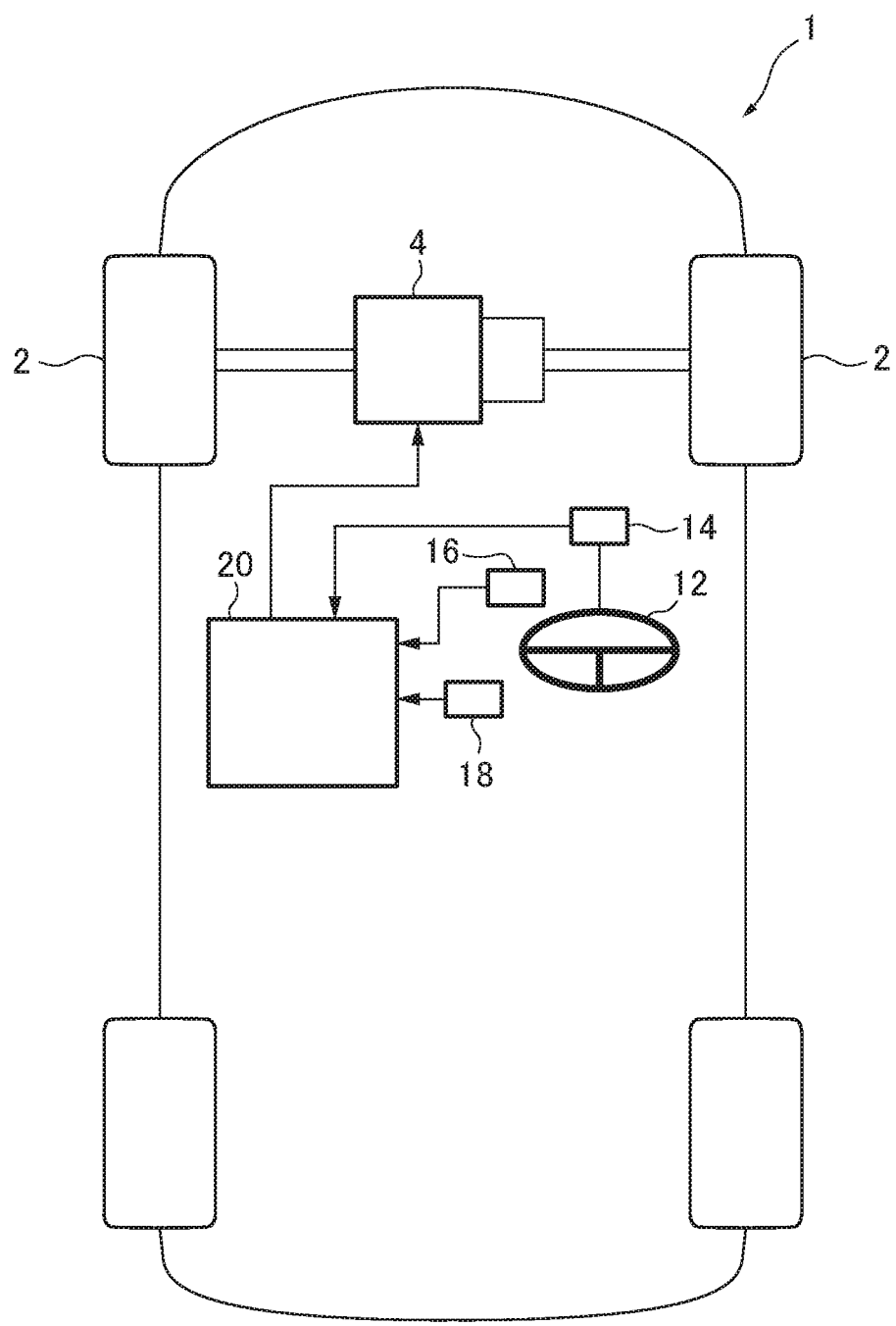
FIG. 1 is a block diagram depicting an entire configuration of a vehicle equipped with a vehicle behavior control device according to one embodiment of the present invention.

First of all, with reference to FIGS. 1 and 2, a vehicle equipped with the vehicle behavior control device according to this embodiment will be described. FIG. 1 is a block diagram depicting an entire configuration of the vehicle equipped with the vehicle behavior control device according to this embodiment, and FIG. 2 is a schematic top plan view depicting an engine to be controlled by the vehicle behavior control device according to this embodiment.

In FIG. 1, the reference sign 1 denotes a vehicle equipped with the vehicle behavior control device according to this embodiment. A vehicle body of the vehicle 1 has a front portion on which an engine 4 for driving drive road wheels (in the vehicle depicted in FIG. 1, right and left front road wheels 2) is mounted.

Figure 2:
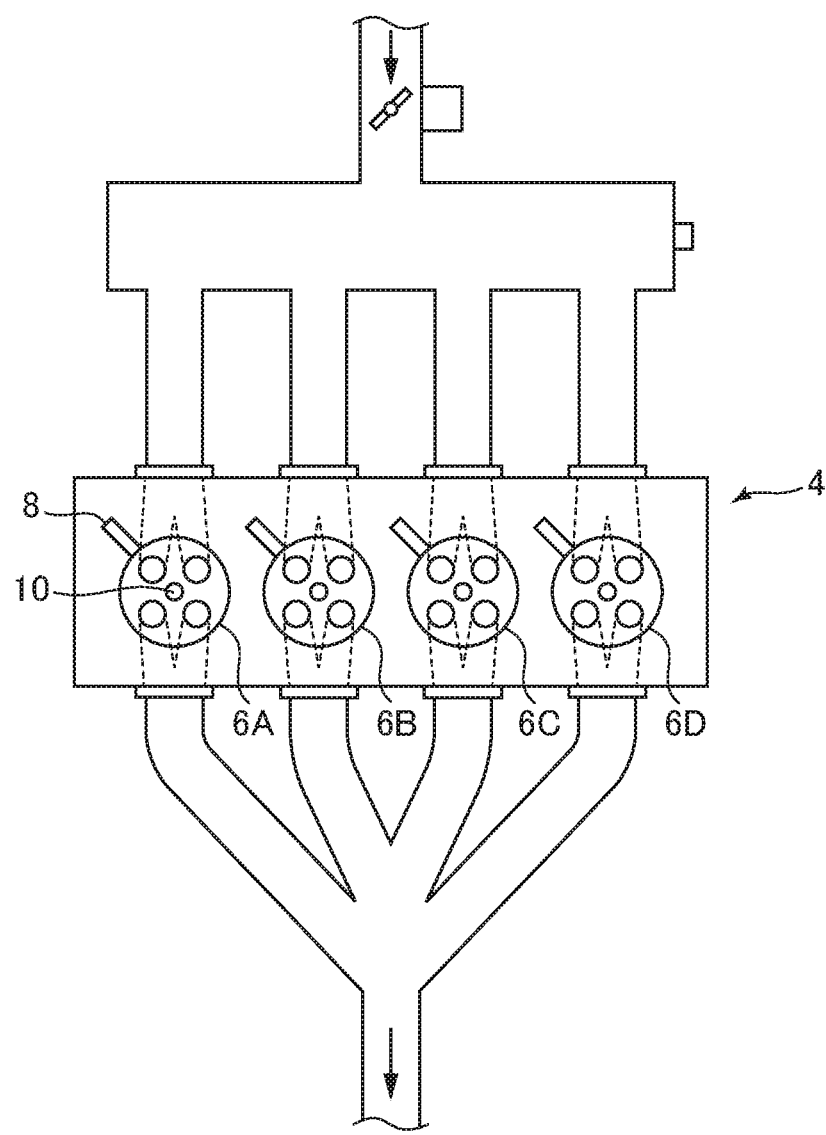
FIG. 2 is a schematic top plan view depicting an engine to be controlled by the vehicle behavior control device according to this embodiment.

As depicted in FIG. 2, the engine 4 pertaining to this embodiment is an in-line four-cylinder gasoline engine comprising four cylinders 6A to 6D arranged side-by-side linearly. The engine 4 is provided with four fuel injection valves 8 each operable to inject fuel toward a combustion chamber in a corresponding one of the cylinders 6A to 6D, four spark plugs 10 each operable to ignite a mixture of intake air and fuel supplied into the corresponding combustion chamber, four pistons each capable of being reciprocatingly moved according to combustion of the air-fuel mixture in the corresponding combustion chamber, and a crankshaft capable of being rotated according to the reciprocating movement of the pistons.

The pistons provided in the cylinders 6A to 6D are configured to be reciprocatingly moved with a phase difference of 180 degrees crank angle (180° C.A). Correspondingly, ignition timings in the cylinders 6A to 6D are set such that they are sequentially shifted in phase by 180° C.A.

The engine 4 pertaining to this embodiment is a cylinder deactivatable engine capable of performing an operation in which two of the four cylinders 6A to 6D are deactivated, and the remaining two cylinders are activated, i.e., a reduced-cylinder operation. The reduced-cylinder operation is performed when an operating state of the engine 4 is in a reduced-cylinder operation range where an engine speed and an engine load are relatively low, and the all-cylinder operation is performed when the operating state of the engine 4 is in an all-cylinder operation range which is the remaining engine operating range other than the reduced-cylinder operation range.

Assuming that the cylinder 6A, the cylinder 6B, the cylinder 6C and the cylinder 6D arranged side-by-side rightwardly in FIG. 2 are defined, respectively, as a first cylinder, a second cylinder, a third cylinder and a fourth cylinder, during the all-cylinder operation, ignition (firing) is performed in the following order: the first cylinder 6A→the third cylinder 6C→the fourth cylinder 6D→the second cylinder 6B.

On the other hand, during the reduced-cylinder operation, an ignition operation of the spark plugs 8 is prohibited in two of the cylinders which are mutually non-consecutive in terms of a firing order (combustion sequence) (in the engine 4 pertaining to this embodiment, the first cylinder 6A and the fourth cylinder 6D), and alternately performed in the remaining two cylinders (i.e., the third cylinder 6C and the second cylinder 6B).

The vehicle 1 has: a steering wheel angle sensor 14 for detecting a rotational angle of a steering wheel 12 (steering wheel angle); an accelerator position sensor 16 for detecting an amount of depression of an accelerator pedal (accelerator position); and a vehicle speed sensor 18 for detecting a vehicle speed. Each of the above sensors is operable to output a detection value to a PCM (Power-train Control Module) 20.

Figure 3:
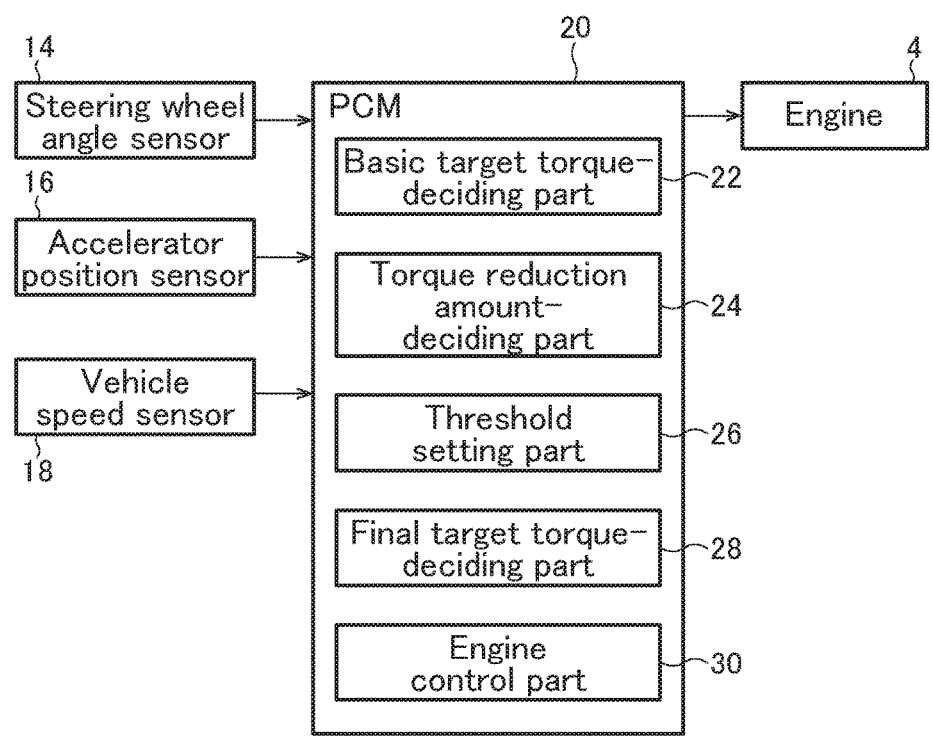
FIG. 3 is a block diagram depicting an electrical configuration of the vehicle behavior control device according to this embodiment.

Next, with reference to FIG. 3, an electrical configuration of the vehicle behavior control device according to this embodiment will be described. FIG. 3 is a block diagram depicting the electrical configuration of the vehicle behavior control device according to this embodiment.

The PCM 20 (vehicle behavior control device) according to this embodiment is configured to, based on detection signals output from the above sensors 8 to 12, and detection signals output from various other sensors for detecting the operating state of the engine 4, generate and output control signals to perform controls with respect to various components (e.g., a throttle valve, a turbocharger, a variable valve mechanism, an ignition unit, the fuel injection valves, and an EGR unit) of the engine 4.

The PCM 20 comprises: a basic target torque-deciding part 22 for deciding a basic target torque based on a driving state of the vehicle 1 including an accelerator pedal operation; a torque reduction amount-deciding part 24 for deciding a torque reduction amount for adding a deceleration to the vehicle 1 based on a yaw rate-related quantity of the vehicle 1; a threshold setting part 26 for setting a threshold $T_S$ concerning the yaw rate-related quantity and serving as a boundary value for determining whether the torque reduction according to the yaw rate-related quantity of the vehicle 1 should be performed or stopped; a final target torque-deciding part 28 for deciding a final target torque based on the basic target torque and the torque reduction amount; and an engine control part 30 for controlling the engine 4 to cause the engine 4 to output the final target torque. This embodiment will be described based on an assumption that the torque reduction amount-deciding part 24 is configured to use a steering speed of the vehicle 1 as the yaw rate-related quantity.

The above components of the PCM 20 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

Next, with reference to FIGS. 4 to 6, processing to be performed by the vehicle behavior control device will be described.

Figure 4:
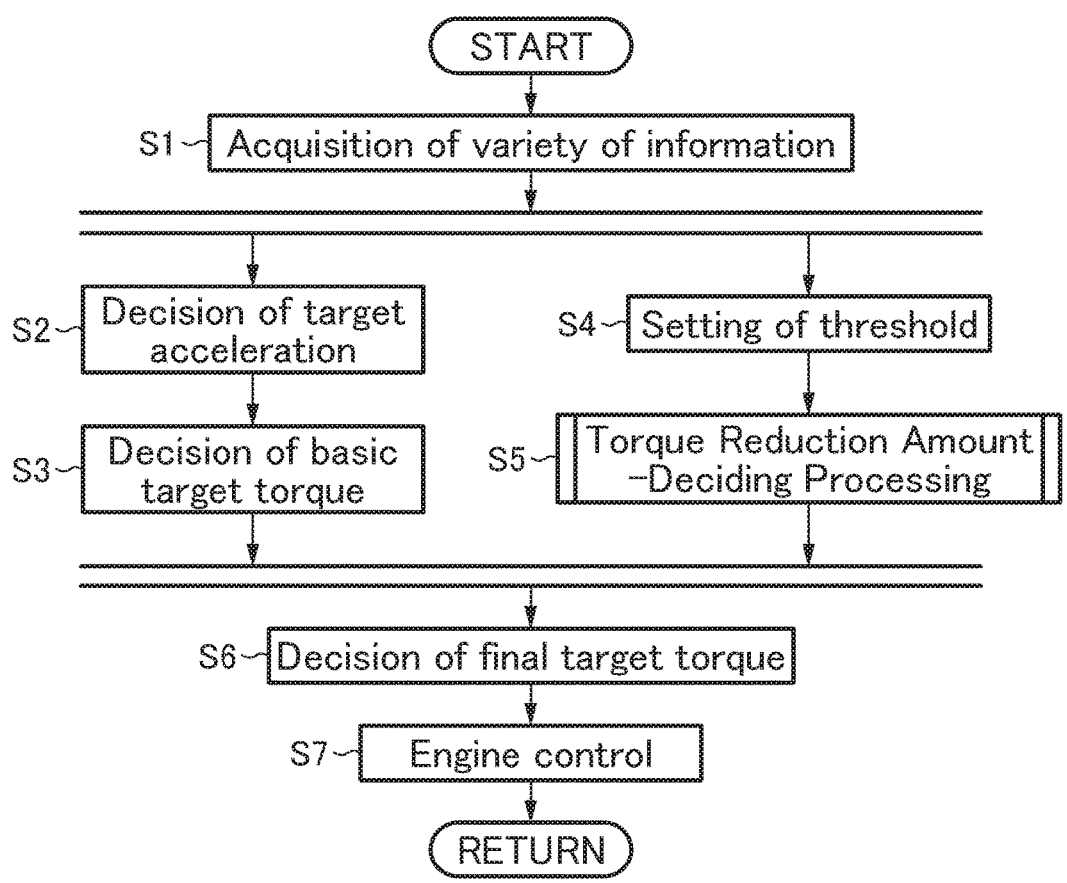
FIG. 4 is a flowchart depicting engine control processing to be performed by the vehicle behavior control device according to this embodiment, so as to control the engine.
Figure 5:
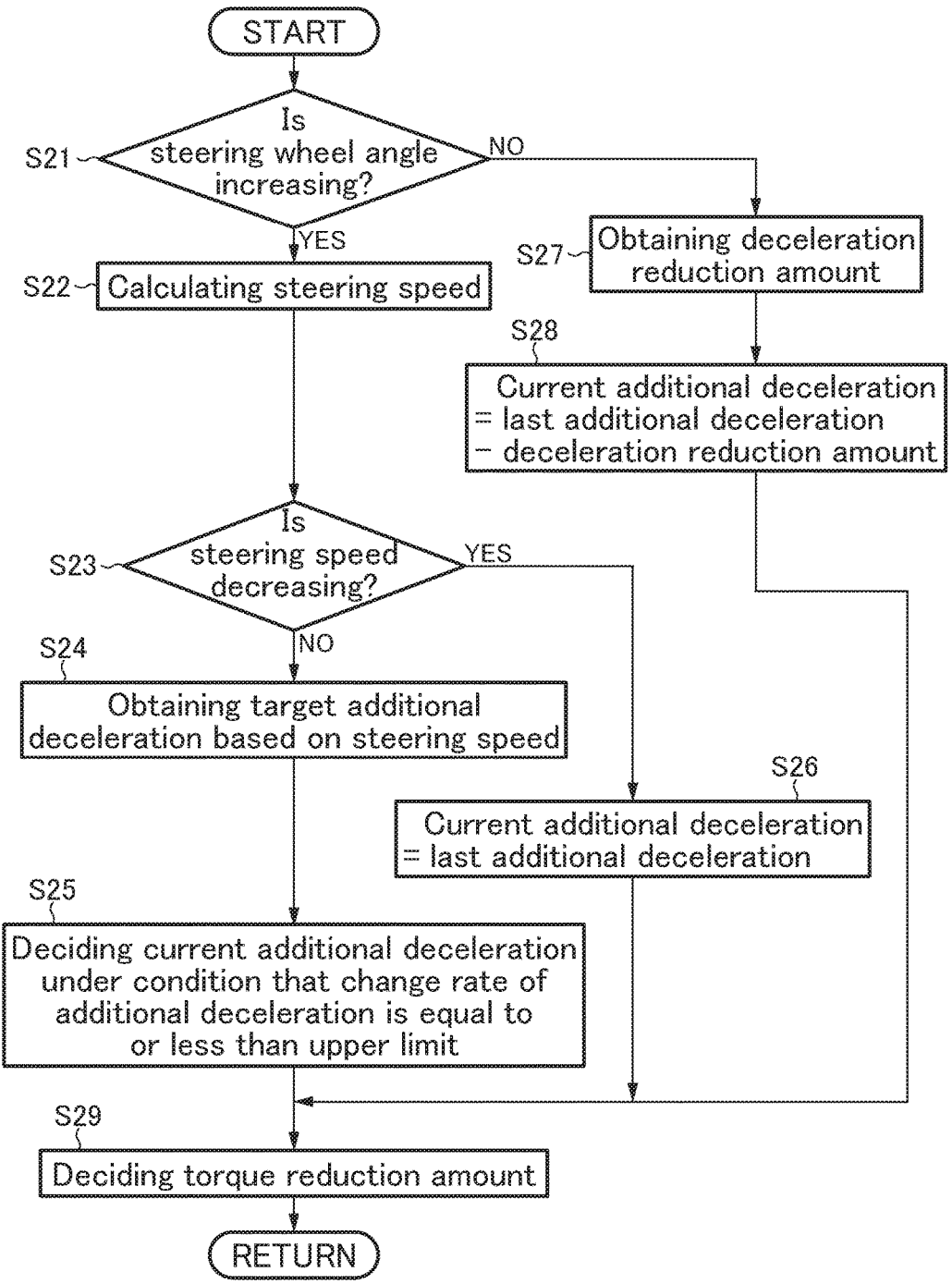
FIG. 5 is a flowchart depicting torque reduction amount-deciding processing to be performed by the vehicle behavior control device according to this embodiment, so as to decide a torque reduction amount.

FIG. 4 is a flowchart depicting engine control processing to be performed by the vehicle behavior control device according to this embodiment, so as to control the engine 4, and FIG. 5 is a flowchart depicting torque reduction amount-deciding processing to be performed by the vehicle behavior control device according to this embodiment, so as to decide the torque reduction amount. FIG. 6 is a map depicting a relationship between the steering speed, and a target additional deceleration to be decided by the vehicle behavior control device according to this embodiment.

The engine control processing in FIG. 4 is activated when an ignition switch of the vehicle 1 is turned on to apply power to the vehicle behavior control device, and repeatedly executed with a given cycle period.

As depicted in FIG. 4, upon start of the engine control processing, in step S1, the PCM 20 operates to acquire a variety of information about the driving state of the vehicle 1. Specifically, the PCM 16 operates to acquire, as information about the driving state, detection signals output from the aforementioned sensors, including the steering wheel angle detected by the steering wheel angle sensor 14, the accelerator position detected by the accelerator position sensor 16, the vehicle speed detected by the vehicle speed sensor 18, a gear stage currently set in a transmission of the vehicle 1, and an operation mode (the all-cylinder operation or the reduced-cylinder operation) of the engine 4.

Subsequently, in step S2, the basic target torque-deciding part 22 of the PCM 20 operates to set a target acceleration based on the driving state of the vehicle 1 including an accelerator pedal operation state, acquired in the step S1. Specifically, the basic target torque-deciding part 22 operates to select, from a plurality of acceleration characteristic maps defined with respect to various vehicle speeds and various gear stages (the maps are preliminarily created and stored in a memory or the like), one acceleration characteristic map corresponding to a current vehicle speed and a current gear stage, and decide a target acceleration corresponding to a current accelerator position, with reference to the selected acceleration characteristic map.

Subsequently, in step S3, the basic target torque-deciding part 22 operates to decide a value of the basic target torque of the engine 4 for realizing the target acceleration decided in the step S2. In this embodiment, the basic target torque-deciding part 22 operates to decide the basic target torque within a torque range outputtable by the engine 4, based on current vehicle speed, gear stage, road grade, road surface mu (μ), etc.

In parallel to the processing in the steps S2 and S3, in step S4, the threshold setting part 26 operates to, based on the operation mode acquired in the step S1, set a threshold concerning the steering speed of the vehicle 1 and serving as a boundary value for determining whether the torque reduction according to the steering speed of the vehicle 1 should be performed or stopped. Specifically, the threshold setting part 26 operates to, when the operation mode of the engine is the all-cylinder operation, set a first threshold $T_{S1}$, and, when the operation mode of the engine is the reduced-cylinder operation, set a second threshold $T_{S2}$ which is less than the first threshold $T_{S1}$ (In the following description, when it is not necessary to distinguish between the first threshold $T_{S1}$ and the second threshold $T_{S2}$, they will be referred to collectively as "threshold $T_S$").

Subsequently, in step S5, the torque reduction amount-deciding part 24 operates to perform torque reduction amount-deciding processing of deciding the torque reduction amount for adding a deceleration to the vehicle 1 according to the steering wheel operation. This torque reduction amount-deciding processing will be described with reference to FIG. 5.

As depicted in FIG. 5, upon start of the torque reduction amount-deciding processing, in step S21, the torque reduction amount-deciding part 24 operates to determine whether or not an absolute value of the steering wheel angle acquired in the step S1 is increasing. As a result, when the absolute value of the steering wheel angle is increasing, the subroutine proceeds to step S22. In the step S22, the torque reduction amount-deciding part 24 operates to calculate a value of the steering speed based on the steering wheel angle acquired in the step S1.

Subsequently, in step S23, the torque reduction amount-deciding part 24 operates to determine whether or not an absolute value of the steering speed is decreasing.

As a result, when the absolute value of the steering speed is not decreasing, i.e., the absolute value of the steering speed is increasing or the absolute value of the steering speed does not change, the subroutine proceeds to step S24. In the step S24, the torque reduction amount-deciding part 24 operates to obtain the target additional deceleration based on the steering speed. This target additional deceleration is a deceleration to be added to the vehicle 1 according to the steering wheel operation in order to accurately realize a vehicle behavior which is intended by a driver.

Figure 6:
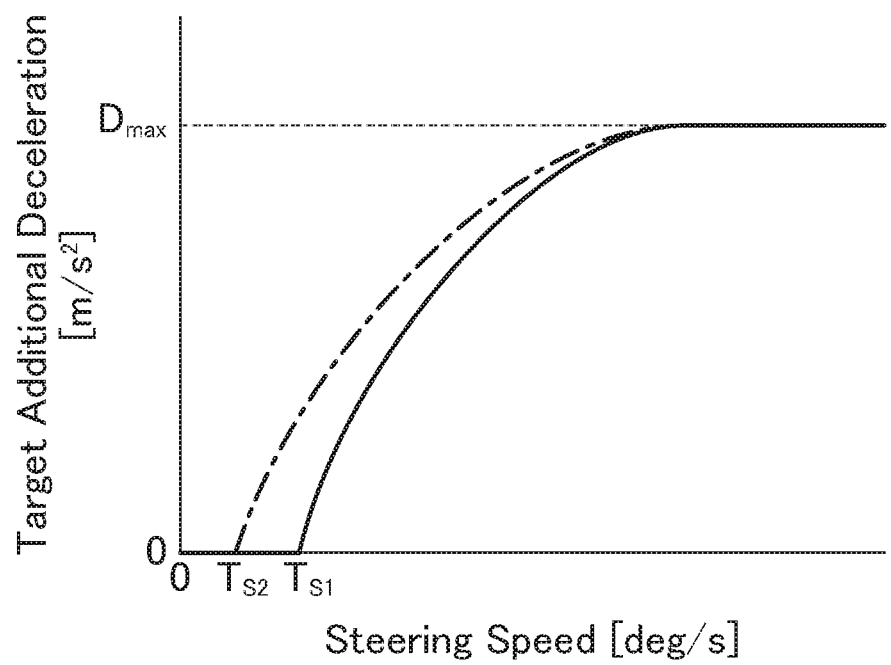
FIG. 6 is a map depicting a relationship between a steering speed, and a target additional deceleration to be decided by the vehicle behavior control device according to this embodiment.

Specifically, the torque reduction amount-deciding part 24 operates to obtain a value of the target additional deceleration corresponding to the steering speed calculated in the step S22, based on a relationship between the target additional deceleration and the steering speed, shown by the map in FIG. 6.

In FIG. 6, the horizontal axis represents the steering speed, and the vertical axis represents the target additional deceleration. Further, in FIG. 6, the solid line denotes a target additional deceleration curve during the all-cylinder operation, and the one-dot chain line denotes a target additional deceleration curve during the reduced-cylinder operation.

As depicted in FIG. 6, when the steering speed is equal to or less than the threshold $T_{S1}$ or $T_{S2}$, a corresponding value of the target additional deceleration is 0. That is, when the steering speed is equal to or less than the first threshold $T_{S1}$ during the all-cylinder operation, or when the steering speed is equal to or less than the second threshold $T_{S2}$ during the reduced-cylinder operation, the PCM 16 operates to stop control of adding a deceleration to the vehicle 1 (specifically, stop reducing an output torque of the engine 4) according to the steering wheel operation.

On the other hand, when the steering speed is greater than the first threshold $T_{S1}$ during the all-cylinder operation, or when the steering speed is greater than the second threshold $T_{S2}$ during the reduced-cylinder operation, as the steering speed is increased to a higher value, a value of the target additional deceleration corresponding to this steering speed comes closer to a given upper limit value $D_{max}$ (e.g., 1 m/s²). That is, as the steering speed is increased to a higher value, the target additional deceleration is increased to a larger value, and a rate of increase of the target additional deceleration becomes smaller.

Subsequently, in the step S25, the torque reduction amount-deciding part 24 operates to decide an additional deceleration in the current processing cycle, under a condition that an increase rate of the additional deceleration is equal to or less than an upper limit $R_{max}$ (e.g., 0.5 m/s³).

Specifically, the torque reduction amount-deciding part 24 operates to, when an increase rate from a value of the additional deceleration decided in the last processing cycle to a value of the additional deceleration obtained in the step S24 in the current processing cycle is equal to or less than the upper limit $R_{max}$, decide the value of the additional deceleration obtained in the step S24, as a value of the additional deceleration in the current processing cycle.

On the other hand, the torque reduction amount-deciding part 24 operates to, when the increase rate from the value of the additional deceleration decided in the last processing cycle to the value of the additional deceleration obtained in the step S24 in the current processing cycle is greater than the upper limit $R_{max}$, decide, as the value of the additional deceleration in the current processing cycle, a value obtained by increasing the value of the additional deceleration decided in the last processing cycle, at the increase rate $R_{max}$.

Referring to the step S23 again, when the absolute value of the steering speed is decreasing, the subroutine proceeds to step S26. In the step S26, the torque reduction amount-deciding part 24 operates to decide the value of the additional deceleration decided in the last processing cycle, as the value of the additional deceleration in the current processing cycle. That is, when the absolute value of the steering speed is decreasing, a value of the additional deceleration corresponding to a maximum value of the steering speed (i.e., a maximum value of the additional deceleration) is maintained.

Referring to the step S21 again, when the absolute value of the steering wheel angle is not increasing (i.e., is maintained constant or is decreasing), the subroutine proceeds to step S27. In the step S27, the torque reduction amount-deciding part 24 operates to obtain an amount (deceleration reduction amount) by which the value of the additional deceleration decided in the last processing cycle is to be reduced in the current processing cycle. For example, the deceleration reduction amount may be calculated based on a constant reduction rate (e.g., 0.3 m/s³) preliminarily stored in a memory or the like. Alternatively, the deceleration reduction amount may be calculated based on a reduction rate decided according to the driving state of the vehicle 1 acquired in the step S1 and/or the steering speed calculated in Step S22.

Subsequently, in step S28, the torque reduction amount-deciding part 24 operates to decide a value of the additional deceleration in the current processing cycle by subtracting the deceleration reduction amount obtained in the step S27 from the value of the additional deceleration decided in the last processing cycle.

After completion of the step S25, S26 or S28, in step S29, the torque reduction amount-deciding part 24 operates to decide the torque reduction amount, based on the current additional deceleration decided in the step S25, S26 or S28. Specifically, the torque reduction amount-deciding part 24 operates to decide a value of the torque reduction amount required for realizing the current additional deceleration, based on the current vehicle speed, gear stage, road gradient and others acquired in the Step S1. After completion of the step S29, the torque reduction amount-deciding part 24 operates to terminate the torque reduction amount-deciding processing, and the subroutine returns to the main routine.

Returning to FIG. 4, after performing the processing in the step S3 and the torque reduction amount-deciding processing in the step S5, in step S6, the final target torque-deciding part 28 operates to subtract a value of the torque reduction amount decided by the torque reduction amount-deciding processing in the step S5, from a value of the basic target torque decided in the step S3 to thereby decide the final target torque.

Subsequently, in step S7, the engine control part 30 operates to control the engine 4 to cause the engine 4 to output the final target torque set in the step S6. Specifically, the engine control part 30 operates to, based on the final target torque set in the step S6 and the engine speed, decide various engine state amounts (e.g., air charge amount, fuel injection amount, intake-air temperature, and oxygen concentration) required for realizing the final target torque set in the step S6, and then, based on the decided state amounts, control a plurality of actuators for driving various components of the engine 4. In this case, the engine control part 30 operates to perform engine control in such a manner as to set a limit value or range with respect to each of the state amounts, and set a controlled variable of each actuator to allow its related state amount to preserve limitation by the limit value or range.

After completion of the step S7, the PCM 20 operates to terminate the engine control processing.

Figure 7:
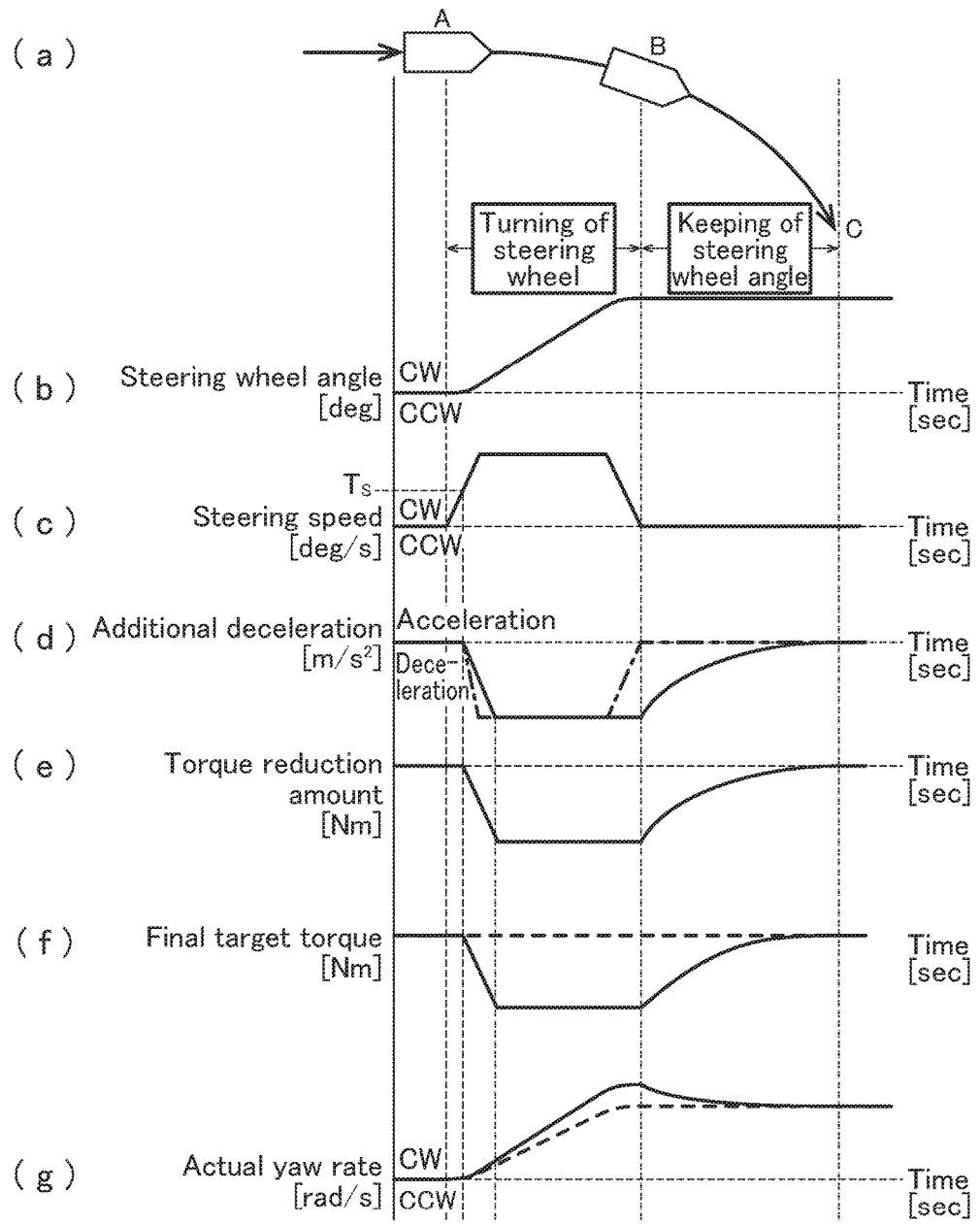
FIG. 7 is a diagram depicting a temporal change of each parameter pertaining to engine control to be performed by the vehicle behavior control device according to this embodiment during turning of a vehicle equipped with the vehicle behavior control device, wherein: chart (a) is a top plan view schematically depicting the vehicle which is turning in a clockwise direction; chart (b) is a chart depicting a change in steering wheel angle of the vehicle which is turning in the clockwise direction as depicted in chart (a); chart (c) is a chart depicting a change in steering speed of the vehicle which is turning in the clockwise direction as depicted in chart (a); chart (d) is a chart depicting a change in additional deceleration decided based on the steering speed depicted in chart (c); chart (e) is a chart depicting a change in torque reduction amount decided based on the additional deceleration depicted in chart (d); chart (f) is a chart depicting a change in final target torque decided based on a basic target torque and the torque reduction amount; and chart (g) is a chart depicting a change in yaw rate (actual yaw rate) generated in the vehicle when the engine control is performed based on the final target torque depicted in chart (f), and a change in actual yaw rate generated in the vehicle when the engine control based on the torque reduction amount decided by a torque reduction amount-deciding part is not performed.

Next, with reference to FIG. 7, an operation of the vehicle behavior control device according to this embodiment will be described. FIG. 7 is a diagram depicting a temporal change of each parameter pertaining to the engine control to be performed by the vehicle behavior control device according to this embodiment during turning of the vehicle 1 equipped with the vehicle behavior control device.

Chart (a) is a top plan view schematically depicting the vehicle 1 which is turning in a clockwise direction. As depicted in chart (a), the vehicle 1 starts to turn from a position A, and continues to turn from a position B to a position C in the clockwise direction at a constant steering wheel angle.

Chart (b) is a chart depicting a change in steering wheel angle of the vehicle 1 which is turning in the clockwise direction as depicted in chart (a). In chart (b), the horizontal axis represents the time, and the vertical axis represents the steering wheel angle.

As depicted in chart (b), clockwise steering is started at the position A, and then, along with an additional turning operation of the steering wheel, a clockwise steering wheel angle gradually increases and reaches a maximum value at the position B. Subsequently, the steering wheel angle is maintained constant until the vehicle 1 reaches the position C (Keeping of the steering wheel angle).

Chart (c) is a chart depicting a change in steering speed of the vehicle 1 which is turning in the clockwise direction as depicted in chart (b). In chart 7(c), the horizontal axis represents the time, and the vertical axis represents the steering speed.

The steering speed of the vehicle 1 is expressed as a temporal differentiation of the steering wheel angle of the vehicle 1. That is, as depicted in chart (c), when clockwise steering is started at the position A, a clockwise steering speed arises and is maintained approximately constant in an intermediate zone between the position A and the position B. Then, when the clockwise steering speed deceases and the clockwise steering wheel angle reaches the maximum value at the position B, the steering speed becomes 0. Then, when the clockwise steering wheel angle is maintained during traveling from the position B to the position C, the steering speed is kept at 0.

Chart (d) is a chart depicting a change in the additional deceleration decided based on the steering speed depicted in chart (c). In chart (d), the horizontal axis represents the time, and the vertical axis represents the additional deceleration. In chart (d), the solid line indicates a change in the additional deceleration decided in the torque reduction amount-deciding processing in FIG. 5, and the one-dot chain line indicates a change in the target additional deceleration based on the steering speed. The target additional deceleration indicated by the one-dot chain line starts to increase when the steering speed depicted in chart (c) becomes greater than the threshold $T_S$, and is maintained approximately constant in an intermediate zone between the position A and the position B, whereafter it decreases, and becomes 0 at the position B.

As described with reference to FIG. 5, when the steering wheel angle is determined in the step S21 to be increasing, and the absolute value of the steering speed is determined in the step S23 to be not decreasing, i.e., to be increasing or to have no change, the torque reduction amount-deciding part 24 operates in the step S24 to obtain the target additional deceleration based on the steering speed. Subsequently, in the step S25, the torque reduction amount-deciding part 24 operates to decide the additional deceleration in each processing cycle, under the condition that the increase rate of the additional deceleration is equal to or less than the upper limit $R_{max}$.

Chart (d) depicts a case where an increase rate of the target additional deceleration starting to increase when the steering speed becomes greater than the threshold $T_S$. In this case, the torque reduction amount-deciding part 24 operates to increase the last additional deceleration at an increase rate equal to the upper limit $R_{max}$ (i.e., at an increase rate providing a gentler slope than that of the target additional deceleration indicated by the one-dot chain line). Then, when the target additional deceleration is maintained approximately constant in the intermediate zone between the position A and the position B, the torque reduction amount-deciding part 24 operates to decide that the additional deceleration is equal to the target additional deceleration.

As mentioned above, the second threshold $T_{S2}$ used during the reduced-cylinder operation is less than the first threshold $T_{S1}$ used during the all-cylinder operation. Thus, a timing at which the steering speed becomes greater than the threshold $T_S$ after start of the steering wheel operation is earlier during the reduced-cylinder operation than during the all-cylinder operation. That is, a timing at which the target additional deceleration rises up after start of the steering wheel operation is earlier during the reduced-cylinder operation than during the all-cylinder operation.

In addition, because the second threshold $T_{S2}$ used during the reduced-cylinder operation is less than the first threshold $T_{S1}$ used during the all-cylinder operation, a frequency of occurrence of a situation where the steering speed becomes equal to or less than the threshold $T_S$ (i.e., a situation where the target additional deceleration becomes 0) is lower during the reduced-cylinder operation than during the all-cylinder operation.

Then, when the absolute value of the steering speed is determined, in the step S23 depicted in FIG. 5, to be decreasing, the torque reduction amount-deciding part 24 operates to maintain the additional deceleration at the maximum steering speed, as mentioned above. Specifically, in chart (d), when the steering speed decreases toward the position B, the target additional deceleration indicated by the one-dot chain line also decreases along therewith, but the additional deceleration indicated by the solid line is maintained at its maximum value, until the vehicle 1 reaches the position B.

On the other hand, when the absolute value of the steering angle is determined, in the step S21 depicted in FIG. 5, to be maintained constant or to be decreasing, the torque reduction amount-deciding part 24 operates to obtain the deceleration reduction amount in the step S27, and reduce the additional deceleration by the obtained deceleration reduction amount, as mentioned above. In chart (d), the torque reduction amount-deciding part 24 operates to reduce the last additional deceleration to cause a reduction rate of the additional deceleration to become gradually smaller, i.e., to cause a slope of the solid line indicative of a change in the additional deceleration to become gradually gentler.

Chart (e) is a chart depicting a change in the torque reduction amount decided based on the additional deceleration depicted in chart (d). In chart (e), the horizontal axis represents the time, and the vertical axis represents the torque reduction amount.

As mentioned above, the torque reduction amount-deciding part 24 operates to decide a value of the torque reduction amount required for realizing an additional deceleration, based on parameters such as current vehicle speed, gear stage and road gradient. Thus, in the case where respective values of these parameters are constant, the torque reduction amount is decided such that it changes in the same pattern as that of the additional deceleration depicted in chart (d).

As mentioned above, the timing at which the target additional deceleration rises up after start of the steering wheel operation is earlier during the reduced-cylinder operation than during the all-cylinder operation. Thus, a timing at which the torque reduction amount rises up after start of the steering wheel operation is earlier during the reduced-cylinder operation than during the all-cylinder operation. Further, the frequency of occurrence of the situation where the target additional deceleration becomes 0 is lower during the reduced-cylinder operation than during the all-cylinder operation, and therefore a frequency of stopping the output torque reduction according to the steering speed is lower during the reduced-cylinder operation than during the all-cylinder operation. In other words, a frequency of performing the output torque reduction according to the steering speed is higher during the reduced-cylinder operation than during the all-cylinder operation.

Chart (f) is a chart depicting a change in the final target torque decided based on the basic target torque and the torque reduction amount. In chart (f), the horizontal axis represents the time, and the vertical axis represents the torque. In chart (f), the dotted line indicates the basic target torque, and the solid line indicates the final target torque.

As described with reference to FIG. 4, the final target torque-deciding part 28 operates to subtract the value of the torque reduction amount decided by the torque reduction amount-deciding processing in the step S5, from the value of the basic target torque decided in the step S3, to thereby decide the final target torque.

Chart (g) is a chart depicting a change in yaw rate (actual yaw rate) generated in the vehicle 1 when control of the engine 4 is performed based on the final target torque depicted in chart (f), and a change in actual yaw rate generated in the vehicle 1 when the control of the engine 4 based on the torque reduction amount decided by the torque reduction amount-deciding part is not performed (i.e., the control of the engine 4 is performed so as to realize the basic target torque indicated by the dotted line in chart (f)). In chart (g), the horizontal axis represents the time and the vertical axis indicates the yaw rate. Further, in chart (g), the solid line indicates a change in actual yaw rate generated when the control of the engine 4 is performed so as to realize the final target torque, and the dotted line indicates a change in actual yaw rate generated when the control compatible with the torque reduction amount is not performed.

When the steering speed becomes greater than the threshold $T_S$ after clockwise steering is started at the position A, the torque reduction amount starts to increase along with an increase in the clockwise steering speed, as depicted in chart (e), so that a load applied to the front road wheels 2 as steerable road wheels of the vehicle 1 is increased. As a result, a frictional force between each of the front road wheels 2 and a road surface is increased, thereby providing an improved turn-in ability of the vehicle 1. That is, as depicted in chart (g), when the control of the engine 4 is performed in the intermediate zone between the position A and the position B so as to realize the final target torque reflecting the torque reduction amount (solid line), a larger clockwise (CW) yaw rate is generated in the vehicle 1, as compared to the case where the control compatible with the torque reduction amount is not performed (dotted line).

As mentioned above, because the second threshold $T_{S2}$ used during the reduced-cylinder operation is less than the first threshold $T_{S1}$ used during the all-cylinder operation, the timing at which the torque reduction amount rises up after start of the steering wheel operation is earlier during the reduced-cylinder operation than during the all-cylinder operation. Thus, when the control of the engine 4 is performed during the reduced-cylinder operation so as to realize a reduction of the final target torque corresponding to a rise in the torque reduction amount, it becomes possible to start the control of the engine 4 from a cylinder 6 which precedes a cylinder during the all-cylinder operation in terms of a firing order (combustion sequence), to thereby prevent delay in a timing at which a cornering force of front road wheels is increased based on the output torque reduction, and a timing at which a reaction force to the steering wheel is increased according to the increase in the cornering force.

Further, because the second threshold $T_{S2}$ used during the reduced-cylinder operation is less than the first threshold $T_{S1}$ used during the all-cylinder operation, the frequency of performing the output torque reduction according to the steering speed is higher during the reduced-cylinder operation than during the all-cylinder operation, so that it becomes possible to compensate for an influence of the fact that the number of cylinders 6 capable of being subjected to the control of reducing the output torque according to the steering speed during the reduced-cylinder operation (i.e., in this embodiment, the third cylinder 6C and the second cylinder 6B) is less than that during the all-cylinder operation, with an increase in frequency of performing the output torque reduction according to the steering speed and thus suppress giving an uncomfortable feeling to a driver.

In the above embodiment, as depicted in FIGS. 7(d) and 7(e), although the target additional deceleration decreases along with a decrease in the steering speed toward the position B, the load applied to the front road wheels 2 is maintained as long as the tuning of the steering wheel is continued, because the torque reduction amount is maintained at its maximum value. Thus, it becomes possible to maintain the turn-in ability of the vehicle 1.

In the above embodiment, when the absolute value of the steering wheel angle is maintained constant during traveling from the position B to the position C, the torque reduction amount is smoothly reduced. Thus, in response to completion of the turning of the steering wheel, the load applied to the front road wheels 2 can be gradually reduced to gradually reduce the cornering force of the front road wheels 2, thereby restoring the output torque of the engine 4, while stabilizing a vehicle body.

Next, the threshold $T_S$ will be described which is used in the aforementioned engine control processing as a boundary value for allowing the PCM 20 to determine whether the control for adding a deceleration to the vehicle 1 (i.e., the reduction of the output torque of the engine 4) according to the steering wheel operation should be performed or stopped.

In order to find an appropriate set value of the first threshold $T_{S1}$, the present inventors conducted an experiment for obtaining a driver's subjective evaluation on a behavior of the vehicle 1 equipped with the vehicle behavior control device according to the above embodiment, when the vehicle 1 was driven along a straight road under each of a plurality of different first threshold $T_{S1}$ changed stepwise by 1 deg/s within the range of 1 deg/s to 8 deg/s. The experiment was conducted plural times by each of a plurality of drivers, and an average of evaluation scores as a result of the subjective evaluations was obtained. Experimental conditions are as follows:

Vehicle: Mazda Axela (2014 model, front drive, with 1.5 L gasoline engine and automatic transmission)

Vehicle weight: 1226 kg

Toe angle: 0.11°±0° 20'

Diameter of steering wheel: 36 cm

Experimental course: 1.4-km straight road

Vehicle speed: 80 to 100 km/h

Figure 8:
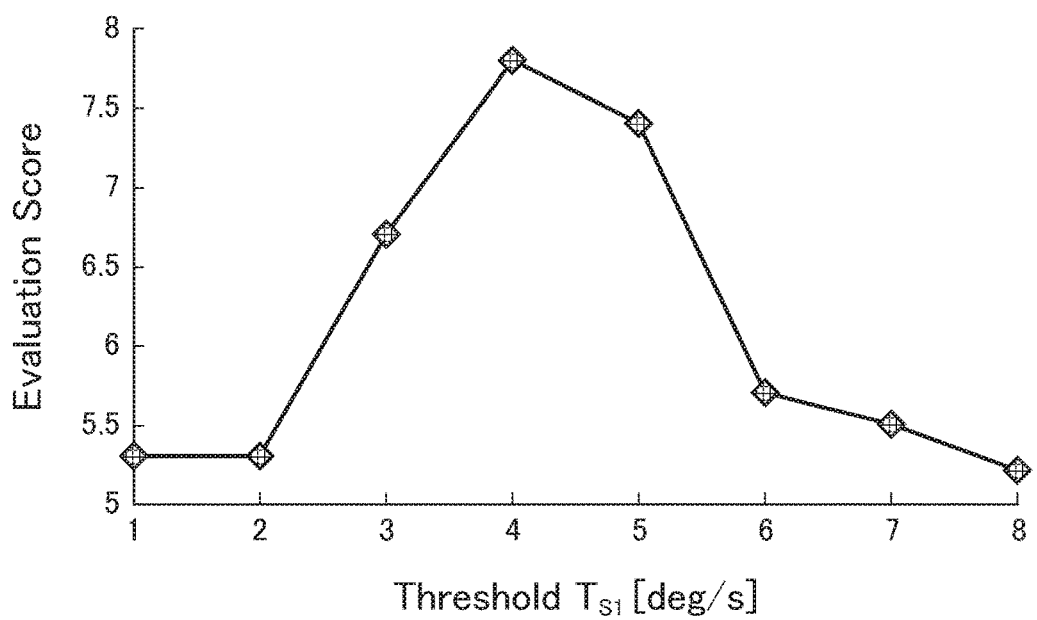
FIG. 8 is a graph depicting a driver's subjective evaluation on a vehicle behavior during straight-ahead driving of a vehicle, in the case where a threshold $T_S$ is changed.

A result of the experiments is depicted in FIG. 8. FIG. 8 is a graph depicting the driver's subjective evaluation on the vehicle behavior during straight-ahead driving of the vehicle 1, in the case where the first threshold $T_{S1}$ was changed. In FIG. 8, the horizontal axis represents the first threshold $T_{S1}$, and the vertical axis represents the evaluation score concerning the behavior of the vehicle 1. The subjective evaluation was performed such that each of the drivers evaluated an operational feeling of the steering wheel 12 and the behavior (responsiveness and stability) of the vehicle 1 by a scoring procedure. For example, the score "5" of the evaluation score indicates a level in which there is an unfavorable opinion in the market but a few. The score "6" indicates a level in which there is almost no favorable or unfavorable opinion, and the score "7" indicates a level in which there are a lot of unfavorable opinions.

As seen in FIG. 8, when the first threshold $T_{S1}$ is set to a value less than 3 deg/s, the evaluation score is gradually lowered, as the first threshold $T_{S1}$ becomes smaller, and is limited to about 6. This is because in case of setting the first threshold $T_{S1}$ to a value falling within this range, even when the steering wheel operation is slowly performed by a small steering wheel angle, the PCM 20 operates to perform the torque reduction to provide an improved turn-in ability of the vehicle 1, thereby causing a situation where some drivers felt that straight-ahead driving performance became poor due to a vehicle behavior of the vehicle 1 excessively sensitive to the steering wheel operation during straight-ahead driving of the vehicle 1. Moreover, the torque reduction leads to an increase in cornering force of the vehicle 1 and thus an increase in reaction force to the steering wheel, thereby causing a situation where some drivers were given an uncomfortable feeling, due to a resistive force around an intermediate angular position of the steering wheel 12.

Further, when the first threshold $T_{S1}$ is set to a value greater than 5 deg/s, the evaluation score is sharply lowered, as the first threshold $T_{S1}$ becomes larger, and is limited to about 5. This is because in case of setting the first threshold $T_{S1}$ to a value falling within this range, due to an excessively wide range of steering speed in which the PCM 20 operates to stop the torque reduction, a delay occurs between a time when a driver starts the steering wheel operation and a time when the PCM 20 operates to perform the torque reduction, thereby causing a situation where some drivers felt unreliable due to poor responsiveness of the vehicle 1 during straight-ahead driving of the vehicle 1, or felt discontinuity in operation of the steering wheel 12.

On the other hand, when the first threshold $T_{S1}$ is set in the range of 3 deg/s to 5 deg/s, an excellent evaluation result having an evaluation score of greater than 7 can be obtained, as seen in FIG. 8. In case of setting the first threshold $T_{S1}$ to a value falling within this range, such an excellent evaluation result can be obtained because of a good balance between responsiveness of the vehicle 1 to the steering wheel operation during straight-ahead driving of the vehicle 1, and an operational feeling of the steering wheel. Particularly, in case of setting the first threshold $T_{S1}$ to 4 deg/s, it is possible to control the behavior of the vehicle 1 with good responsiveness to a steering wheel operation for maintaining the straight-ahead driving state, without causing a situation where the vehicle 1 excessively sensitively responses to a steering wheel operation during straight-ahead driving of the vehicle 1, so that a driver is allowed to easily maintain the straight-ahead driving state and operate the steering wheel 12 stably without feeling excessive heaviness. Thus, the best evaluation result could be obtained.

In the case where the first threshold $T_{S1}$ is set in the range of 3 deg/s to 5 deg/s, preferably to 4 deg/s, as mentioned above, it is desirable to set the second threshold $T_{S2}$ to a value less than the first threshold $T_{S1}$ by 1 deg/s (i.e., set in the range of 2 deg/s to 4 deg/s, preferably 3 deg/s).

Next, some modifications of the above embodiment will be described.

Although the above embodiment has been described based on an example in which the torque reduction amount-deciding part 24 is configured to obtain the target additional deceleration based on the steering speed as the yaw rate-related quantity, and decide the torque reduction amount based on the obtained target additional deceleration, the torque reduction amount-deciding part 24 may be configured to decide the torque reduction amount based on any driving state of the vehicle 1 other than the accelerator pedal operation state (e.g., steering wheel angle, yaw rate, or slip ratio).

For example, the torque reduction amount-deciding part 24 may be configured to calculate, as the yaw rate-related quantity, a target yaw acceleration to be generated in the vehicle 1, based on a target yaw rate calculated from the steering wheel angle and the vehicle speed, and a yaw rate input from a yaw rate sensor, and obtain the target additional deceleration based on the calculated target yaw acceleration to decide the torque reduction amount. In this case, the PCM 20 is configured to, when the target yaw acceleration is equal to or less than a first threshold during the all-cylinder operation, or when the target yaw acceleration is equal to or less than a second threshold which is less than the first threshold, during the reduced-cylinder operation, stop a reduction of the output torque of the engine 4 according to the target yaw acceleration.

Further, the PCM 20 is configured to, when the target yaw acceleration is greater than the first threshold during the all-cylinder operation, or when the target yaw acceleration is greater than the second threshold during the reduced-cylinder operation, increase the target additional deceleration to a larger value and reduce an increase rate of the target additional deceleration to a smaller value, as the target yaw acceleration becomes larger.

Alternatively, a lateral acceleration generated along with turning of the vehicle 1 may be detected as the yaw rate-related quantity by an acceleration sensor, and the torque reduction amount may be decided based on the detected lateral acceleration. In this case, the PCM 20 is configured to, when the lateral acceleration is equal to or less than a first threshold during the all-cylinder operation, or when the lateral acceleration is equal to or less than a second threshold which is less than the first threshold, during the reduced-cylinder operation, stop a reduction of the output torque of the engine 4 according to the lateral acceleration.

Further, the PCM 20 is configured to, when the lateral acceleration is greater than the first threshold during the all-cylinder operation, or when the lateral acceleration is greater than the second threshold during the reduced-cylinder operation, increase the target additional deceleration to a larger value and reduce an increase rate of the target additional deceleration to a smaller value, as the lateral acceleration becomes larger.

Although the above embodiment has been described based on an example in which the engine 4 is an in-line four-cylinder gasoline engine capable of performing the reduced-cylinder operation, wherein during the reduced-cylinder operation, two of the four cylinders 6A to 6D are deactivated, and the remaining two cylinders are activated, the present invention can also be applied to a vehicle equipped with any other type of multi-cylinder gasoline engine different from the in-line four-cylinder gasoline engine (e.g., V-six gasoline engine) or a multi-cylinder diesel engine.

For example, in the case where the engine 4 is a six-cylinder engine, the threshold setting part 26 is configured to set the first threshold $T_{S1}$ when the operation mode of the engine 4 is the all-cylinder operation, and set the second threshold $T_{S2}$ to a smaller value as the number of deactivated cylinders becomes larger when the operation mode of the engine 4 is the reduced-cylinder operation. As one example, assuming that the first threshold $T_{S1}$ used during the all-cylinder operation is 4 deg/s, the threshold setting part 26 is configured to set the second threshold $T_{S2}$ to 3 deg/s when two of the six cylinders are deactivated during the reduced-cylinder operation, and to 2 deg/s when four of the six cylinders are deactivated during the reduced-cylinder operation.

Next, advantageous effects of the vehicle behavior control device according to the above embodiment and the modifications thereof will be described.

First of all, the engine control part 30 is operable, when the steering speed is greater than the predetermined threshold $T_S$, and both of the steering wheel angle of the vehicle 1 and the steering speed are increasing, to increase the torque reduction amount along with an increase in the steering speed, and, when the steering speed is equal to or less than the threshold $T_S$, to stop the torque reduction. Thus, when the steering speed is greater than the threshold $T_S$, it becomes possible to add a deceleration to the vehicle 1 based on the torque reduction amount according to the steering speed to thereby quickly apply a load to the vehicle 1 to control a behavior of the vehicle 1 with a good responsiveness to a driver's intentional steeling wheel operation. On the other hand, when the steering speed is equal to or less than the threshold $T_S$, it becomes possible to suppress excessive responsiveness of the vehicle 1 to a steering wheel operation at a small steering wheel angle to thereby perform a vehicle behavior control so as to accurately realize a vehicle behavior as intended by the driver.

Further, the threshold setting part 26 is operable, when the operation mode of the engine 4 is the all-cylinder operation, to set the first threshold $T_{S1}$ as the threshold $T_S$ concerning the steering speed and serving as a boundary value for determining whether the torque reduction according to the steering speed should be performed or stopped, and, when the operation mode of the engine is the reduced-cylinder operation, to set the second threshold $T_{S2}$ which is less than the first threshold $T_{S1}$, so that a timing at which the torque reduction amount rises up after start of the steering wheel operation is earlier during the reduced-cylinder operation than during the all-cylinder operation. Thus, when control of the engine 4 is performed during the reduced-cylinder operation to reduce the output torque according to the steering speed, it becomes possible to start the control of the engine 4 from a cylinder which precedes a cylinder during the all-cylinder operation in terms of a firing order (combustion sequence), to thereby prevent delay in a timing at which a cornering force of the front road wheels 2 is increased based on the output torque reduction, and a timing at which a reaction force to the steering wheel is increased according to the increase in the cornering force. In addition, the second threshold $T_{S2}$ used during the reduced-cylinder operation is set to be less than the first threshold $T_{S1}$ used during the all-cylinder operation, so that it becomes possible to perform the output torque reduction according to the steering speed, during the reduced-cylinder operation, with a higher frequency than that during the all-cylinder operation to thereby compensate for an influence of the fact that the number of cylinders 6 capable of being subjected to the control of reducing the output torque according to the steering speed during the reduced-cylinder operation is less than that during the all-cylinder operation, with an increase in frequency of performing the output torque reduction according to the steering speed.

This makes it possible to perform a vehicle behavior control so as to accurately realize a vehicle behavior as intended by a driver, without giving any uncomfortable feeling to the driver, even when switching between the all-cylinder operation and the reduced-cylinder operation is performed.

In particular, the first threshold $T_{S1}$ is set in the range of 3 deg/s to 5 deg/s, preferably to 4 deg/s, so that it becomes possible to prevent a driver from feeling that straight-ahead driving performance becomes poor due to a behavior of the vehicle 1 excessively sensitive to a steering wheel operation during straight-ahead driving of the vehicle 1, or from feeling unreliable due to poor responsiveness of the vehicle 1 to a steering wheel operation during straight-ahead driving of the vehicle 1, and further prevent a driver from feeling excessive heaviness or discontinuity in operation of the steering wheel 12. This makes it possible to perform a vehicle behavior control so as to accurately realize a vehicle behavior as intended by a driver, while reliably preventing an uncomfortable feeling concerning a vehicle behavior during straight-ahead driving of the vehicle 1 from being given to the driver.

In the above embodiment, the second threshold $T_{S2}$ is less than the first threshold $T_{S1}$ by 1 deg/s. Thus, when control of the engine 4 is performed during the reduced-cylinder operation to reduce the output torque according to the steering speed, it becomes possible to start the control of the engine 4 at an earlier timing than that during the all-cylinder operation, to thereby prevent delay in the timing at which a cornering force of the front road wheels 2 is increased based on the output torque reduction, and the timing at which a reaction force to the steering wheel 12 is increased according to the increase in the cornering force.

In the above embodiment, the threshold setting part 26 is operable, when the operation mode of the engine 4 is the reduced-cylinder operation, to reduce the second threshold $T_{S2}$ to a smaller value as the number of cylinders to be deactivated to stop combustion of an air-fuel mixture therein becomes larger. Thus, it becomes possible to, as the number of deactivated cylinders during the reduced-cylinder operation becomes larger and thereby a combustion interval becomes longer, advance a timing at which the torque reduction amount rises up after start of the steering wheel operation, and perform the output torque reduction according to the steering speed with a higher frequency. This makes it possible to, even when the number of deactivated cylinders is increased during the reduced-cylinder operation, reliably prevent delay in the timing at which a cornering force of the front road wheels 2 is increased based on the output torque reduction, and the timing at which a reaction force to the steering wheel is increased according to the increase in the cornering force, and reliably suppress uncomfortable feeling given to a driver.

What is claimed is:

1. A vehicle behavior control device for controlling a behavior of a vehicle equipped with a multi-cylinder internal combustion engine capable of switching operation modes between an all-cylinder operation in which combustion of an air-fuel mixture is performed in all of a plurality of cylinders and a reduced-cylinder operation in which combustion in a part of the plurality of cylinders is stopped, comprising:
    an engine control part operable, when a yaw rate-related quantity which is related to a yaw rate of the vehicle is greater than a predetermined threshold, and both of a steering wheel angle of the vehicle and the yaw rate-related quantity are increasing, to reduce an output torque of the engine along with an increase in the yaw rate-related quantity, and
    the engine control part operable, when the yaw rate-related quantity is equal to or less than the predetermined threshold, to stop the reduction of the output torque; and
    a threshold setting part operable, when the operation mode of the engine is the all-cylinder operation, to set the predetermined threshold to a first threshold, and
    the threshold setting part operable, when the operation mode of the engine is the reduced-cylinder operation, to set the predetermined threshold to a second threshold which is less than the first threshold.

2. The vehicle behavior control device as recited in claim 1, wherein the yaw rate-related quantity is a steering speed of the vehicle, and wherein the first threshold is set in the range of 3 deg/s to 5 deg/s.

3. The vehicle behavior control device as recited in claim 2, wherein the first threshold is set to 4 deg/s.

4. The vehicle behavior control device as recited in claim 2, wherein the second threshold is less than the first threshold by 1 deg/s.

5. The vehicle behavior control device as recited in claim 1, wherein the threshold setting part is operable, when the operation mode is the reduced-cylinder operation, to reduce the second threshold to a smaller value as the number of cylinders to be deactivated to stop combustion of an air-fuel mixture therein becomes larger.

6. A vehicle control device comprising a controller to which at least a steering wheel angle, an accelerator position and a vehicle speed are input, and which is configured to control a driving force output from a multi-cylinder internal combustion engine based on the steering wheel angle, the accelerator position and the vehicle speed, wherein the multi-cylinder internal combustion engine is capable of switching operation modes between an all-cylinder operation in which combustion of an air-fuel mixture is performed in all of a plurality of cylinders and a reduced-cylinder operation in which combustion in a part of the plurality of cylinders is stopped, and wherein the controller is configured to:
    reduce the driving force so as to generate an additional deceleration to be added to the vehicle according to steering speed, with reference to a map defining the additional deceleration to be set according to the steering speed which is greater than a given determination minimum value, when the steering wheel angle is increasing and the steering speed is not decreasing, wherein the given determination minimum value for the reduced-cylinder operation is set at a smaller value than the given determination minimum value for the all-cylinder operation;
    reduce the driving force so as to generate the additional deceleration at the maximum steering speed when the steering wheel angle is increasing and the steering speed is decreasing; and
    increase the driving force so as to reduce the additional deceleration when the steering wheel angle is not increasing.

* * * * *